US011513802B2

(12) United States Patent
Boyer et al.

(10) Patent No.: US 11,513,802 B2
(45) Date of Patent: Nov. 29, 2022

(54) COMPRESSING MICRO-OPERATIONS IN SCHEDULER ENTRIES IN A PROCESSOR

(71) Applicant: Advanced Micro Devices, Inc., Santa Clara, CA (US)

(72) Inventors: Michael W. Boyer, Redmond, WA (US); John Kalamatianos, Acton, MA (US); Pritam Majumder, College Station, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/033,883

(22) Filed: Sep. 27, 2020

(65) Prior Publication Data

US 2022/0100501 A1  Mar. 31, 2022

(51) Int. Cl.
*G06F 9/38* (2018.01)
*G06F 9/22* (2006.01)

(52) U.S. Cl.
CPC .............. *G06F 9/3836* (2013.01); *G06F 9/22* (2013.01); *G06F 9/223* (2013.01)

(58) Field of Classification Search
None
See application file for complete search history.

(56) References Cited

U.S. PATENT DOCUMENTS

| 6,212,623 | B1* | 4/2001 | Witt | G06F 9/3814 |
| | | | | 712/214 |
| 2009/0327657 | A1* | 12/2009 | Sperber | G06F 9/3838 |
| | | | | 712/205 |
| 2014/0047221 | A1* | 2/2014 | Irwin | G06F 9/30072 |
| | | | | 712/226 |
| 2018/0046463 | A1* | 2/2018 | King | G06F 9/3855 |
| 2019/0042239 | A1* | 2/2019 | Genden | G06F 9/3855 |
| 2020/0042321 | A1* | 2/2020 | Genden | G06F 9/30181 |

* cited by examiner

*Primary Examiner* — Courtney P Carmichael-Moody
(74) *Attorney, Agent, or Firm* — Park, Vaughan, Fleming & Dowler LLP

(57) ABSTRACT

An electronic device includes a processor having a micro-operation queue, multiple scheduler entries, and scheduler compression logic. When a pair of micro-operations in the micro-operation queue is compressible in accordance with one or more compressibility rules, the scheduler compression logic acquires the pair of micro-operations from the micro-operation queue and stores information from both micro-operations of the pair of micro-operations into different portions in a single scheduler entry. In this way, the scheduler compression logic compresses the pair of micro-operations into the single scheduler entry.

22 Claims, 5 Drawing Sheets

COMPRESSING MICRO-OPERATIONS IN SCHEDULER ENTRIES IN A PROCESSOR

GOVERNMENT RIGHTS

This invention was made with government support under the PathForward Project with Lawrence Livermore National Laboratory (prime contract no. DE-AC52-07NA27344, subcontract no. B620717) awarded by the Department of Energy (DOE). The government has certain rights in this invention.

BACKGROUND

Related Art

In some electronic devices, processors execute program code instructions—or, more simply, instructions—that cause the processors to perform corresponding operations. For example, a processor such as a central processing unit (CPU) may execute instructions from a software application, an operating system, firmware, etc. that cause the processor to perform the corresponding operations. Some processors are able to execute a number of different instructions, sometimes called "macro-instructions," that are decoded by the processors into one or more micro-operations. Each micro-operation is a low-level processor instruction that, when executed by the processor, causes the processor to perform a respective part of the overall operation(s) of the instruction from which the micro-operation was decoded. For example, a single-instruction, multiple-data (SIMD) instruction may be decoded by a processor into a number of separate micro-operations for performing an operation of the SIMD instruction on multiple pieces of data.

In many processors, circuitry (e.g., integrated circuitry on a semiconductor die) that decodes and prepares micro-operations for execution is located on an operational path for which timing is an important concern. That is, due to the speed of execution units that execute micro-operations, when micro-operations are not delivered rapidly enough by the micro-operation decoding and preparation circuitry, the execution units can become undesirably idle. Designers have therefore proposed numerous improvements to the micro-operation decoding and preparation circuitry in order to avoid unnecessary delay in decoding and preparing micro-operations for execution. Unfortunately, despite the efforts of designers, some bottlenecks remain in the micro-operation decoding and preparation circuitry. One such bottleneck occurs in a scheduler, which is a functional block that receives micro-operations from a decoder and forwards the micro-operations to an execution unit for execution when the micro-operations are ready for execution (e.g., when all operands are available, etc.). The bottleneck occurs in the scheduler because the scheduler has only a limited number of scheduler entries for storing micro-operations awaiting forwarding. When the scheduler entries become full of micro-operations, the processor performs a so-called "dispatch stall," during which circuitry that feeds the scheduler (e.g., decode circuitry, etc.) is prevented from feeding micro-operations to the scheduler until one or more scheduler entries becomes available in the scheduler. Simply increasing the capacity, i.e., the number of entries, of the scheduler is not a workable solution to the problem of dispatch stalls because the circuitry of the scheduler is often located in area-constrained parts of the semiconductor die where adding circuitry and signal routes is difficult, because the latency of interacting with (e.g., picking, etc.) micro-operations in scheduler entries in the scheduler increases, and for other reasons.

BRIEF DESCRIPTION OF THE FIGURES

Throughout the figures and the description, like reference numerals refer to the same figure elements.

DETAILED DESCRIPTION

Figure 1:
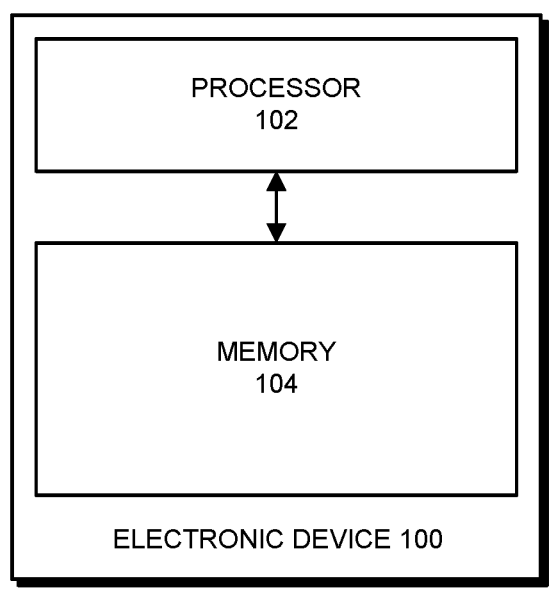
FIG. 1 presents a block diagram illustrating an electronic device in accordance with some embodiments.

The following description is presented to enable any person skilled in the art to make and use the described embodiments and is provided in the context of a particular application and its requirements. Various modifications to the described embodiments will be readily apparent to those skilled in the art, and the general principles described herein may be applied to other embodiments and applications. Thus, the described embodiments are not limited to the embodiments shown, but are to be accorded the widest scope consistent with the principles and features described herein.

Terminology

In the following description, various terms are used for describing embodiments. The following is a simplified and general description of one of the terms. Note that this term may have significant additional aspects that are not recited herein for clarity and brevity and thus the description is not intended to limit this term.

Functional block: functional block refers to a set of interrelated circuitry such as integrated circuit circuitry, discrete circuitry, etc. The circuitry is "interrelated" in that circuit elements in the circuitry share at least one property. For example, the circuitry may be included in, fabricated on, or otherwise coupled to a particular integrated circuit chip, substrate, circuit board, or portion thereof, may be involved in the performance of specified operations (e.g., computational operations, control operations, memory operations, etc.), may be controlled by a common control element and/or a common clock, etc. The circuitry in a functional block can have any number of circuit elements, from a single circuit element (e.g., a single integrated circuit logic gate or discrete circuit element) to millions or billions of circuit elements (e.g., an integrated circuit memory). In some embodiments, functional blocks perform operations "in hardware," using circuitry that performs the operations without executing program code.

Instructions and Micro-Operations

In the described embodiments, a processor executes instructions from program code (e.g., applications, operating systems, firmware, etc.) that cause the processor to perform corresponding operations. Before executing some or all of the instructions, which can be called "macro-instructions," the processor decodes the instructions into "micro-operations" that are executed by the processor. Each micro-operation is a low-level processor instruction which, when executed by the processor, causes the processor to perform a respective part of the operation(s) of the instruction from which the micro-operation was decoded. For example, an ADD instruction can be decoded into a number of micro-operations such as, for the instruction ADD [MEMADDR], EAX:

MOV TMP0, [MEMADDR];
ADD TMP0, EAX; and
MOV TMP0, [MEMADDR].

In this example, the first MOV micro-operation loads a value at memory address MEMADDR from memory into temporary storage, i.e., the TMP0 physical register. The ADD micro-operation then adds the value in the EAX register to the value in the TMP0 physical register. The second MOV micro-operation next stores the value in the TMP0 physical register to the memory address MEMADDR, thereby storing the sum in memory.

In some embodiments, micro-operations include information that is used by the processor for identifying, executing, and/or otherwise handling the micro-operations. The information in each micro-operation is arranged and organized in a format dictated by the architecture of the processor and includes a number of fields, portions, etc., each of which has a set of bits that is used for storing respective pieces or articles of information. Generally, the information included in micro-operations can be any information that is used for identifying, executing, and/or otherwise handling the micro-operations. For example, in some embodiments, each micro-operation includes an operational code, or "opcode," that identifies the micro-operation as a particular micro-operation from among a set of micro-operations supported by the processor. In some embodiments, the opcode is included in the first N bits of each micro-operation (where N is 6, 8, or another number). As another example, a micro-operation can include one or more source and/or destination register identifiers that indicate the registers from which values, if any, are to be acquired and/or written. The source and/or destination register identifiers, if any are present in a given micro-operation, are included in respective bits of the given micro-operation. As another example, a micro-operation can include one or more immediate values to be used when executing the micro-operation. The immediate value, if any is present in a given micro-operation, is included in respective bits of the given micro-operation.

In some embodiments, at least some micro-operations are "full" micro-operations that include much, if not all, of the possible information for a micro-operation (e.g., one or more source register identifiers, immediate values, one or more destination register identifiers, etc.). Other micro-operations, however, are "reduced" micro-operations that include less information than full micro-operations—i.e., include only a subset of the possible information for a micro-operation. While full micro-operations are stored in most, if not all, of the portions of scheduler entries in a processor (scheduler entries are described in more detail below), reduced micro-operations can be stored in less than all of the portions of scheduler entries.

Overview

In the described embodiments, an electronic device includes a processor (e.g., a central processing unit, graphics processing unit, etc.) and a memory subsystem with one or more caches (e.g., an instruction cache in the processor, etc.) and a "main" memory. The processor includes instruction processing circuitry having a fetch/decode unit, a dispatch unit, and one or more execution units. The fetch/decode unit includes circuitry for fetching program code instructions from the instruction cache (or elsewhere in a memory subsystem) and decoding the instructions into micro-operations. After decoding instructions into micro-operations, the fetch/decode unit stores the decoded micro-operations in a micro-operation queue. The micro-operations are retrieved by the dispatch unit from the micro-operation queue and stored in scheduler entries until the micro-operations are ready (e.g., all source operands are available, etc.) to be forwarded to the execution units for execution. The scheduler entries include a number of portions (i.e., fields, storage elements, etc.) into which information for micro-operations can be stored. For example, in some embodiments, each scheduler entry includes portions for storing some or all of opcodes, source and destination register identifiers, immediate values, and/or other micro-operation information.

In the described embodiments, pairs of micro-operations are compressed in scheduler entries by storing information for certain pairs of reduced micro-operations in the portions of a single scheduler entry. For example, assume that each scheduler entry includes portions for storing a two source register identifiers, two destination register identifiers, and an immediate value. In this case, a first micro-operation (i.e., a first reduced micro-operation) with a first source register, an immediate value, and a flag destination, and a second micro-operation (i.e., a second reduced micro-operation) with a second source register and a destination register can be stored at the same time in the portions of a single scheduler entry by repurposing the various portions of the single scheduler entry to hold information for both the first and second micro-operations (instead of, for example, storing the first micro-operation alone in the scheduler entry and leaving some portions empty). In some embodiments, scheduler entries also include sufficient portions for storing two operational codes, or opcodes, and thus the opcodes for pairs of micro-operations can be stored separately in opcode portions of the single scheduler entry. In some embodiments, however, one or both of the opcodes are separately stored in an opcode table, as is described in more detail below.

In the described embodiments, scheduler compression logic monitors micro-operations stored in the micro-operation queue to find pairs of micro-operations that can be compressed in scheduler entries in accordance with compressibility rules. Upon finding a pair of instructions that can be compressed in accordance with the compressibility rules (e.g., when dispatching a group of micro-operations from the micro-operation queue), the scheduler compression logic acquires the pair of instructions from the micro-operation queue and stores information for both micro-operations of the pair of micro-operations into different portions of a single scheduler entry. In other words, the scheduler compression logic stores information for pairs of micro-operations separately in respective portions of single scheduler entries so that information for executing both micro-operations of pairs of micro-operations are stored in single scheduler entries. From the single scheduler entries, the information for each micro-operation of compressed pairs of micro-operations is separately picked by picker logic in the scheduler and forwarded to a corresponding execution unit for execution. In this way, although the pairs of micro-operations are stored in single scheduler entries, the micro-operations themselves remain separate—and are picked and executed separately.

In the described embodiments, the above-described compressibility rules used by the scheduler compression logic include one or more rules to be used for identifying pairs of micro-operations that can (or cannot) be stored together in a single scheduler entry. For example, in some embodiments, the compressibility rules limit the pairs of micro-operations that can be compressed to pairs of micro-operations that can be stored together in a single scheduler entry in the same scheduler and executed consecutively (e.g., in consecutive cycles of a controlling clock, in order, etc.). As another example, in some embodiments, the compressibility rules limit the micro-operations that can be compressed based on the information that is present in the micro-operations—so that all the information from both micro-operations in a candidate pair of micro-operations can be stored simultaneously in a single scheduler entry. As yet another example, in some embodiments, the compressibility rules limit the micro-operations that can be compressed to pairs of micro-operations for which flag accesses and/or other processor actions can be correctly performed to ensure that such processor actions can be performed despite the pairs of micro-operations having been compressed into single scheduler entries.

In some embodiments, as briefly described above, one or both of the opcodes for compressed pairs of micro-operations are not stored in the respective single scheduler entries, but instead are stored in a separate opcode table. Generally, the opcode table includes a number of opcode table entries, each opcode table entry to be used for storing one or both opcodes for a compressed pair of micro-operations that is stored in a single scheduler entry. For example, in some of these embodiments, each scheduler entry includes just one opcode portion (which is otherwise used for storing opcodes for full micro-operations), and the opcodes for both micro-operations of compressed pairs of micro-operations are stored in entries in the opcode table. In these embodiments, a reference to the opcode table entry where the opcodes for the compressed pair of micro-operations is stored in the opcode portion of the scheduler entry. As another example, in some of these embodiments, each scheduler entry includes an opcode portion (which is otherwise used for storing opcodes for full micro-operations) and a reference portion, and the opcode for a first micro-operation of a given compressed pair of micro-operations is stored in the opcode portion of the scheduler entry, while the opcode for the second micro-operation of the given compressed pair of micro-operations is separately stored in an entry in the opcode table. In these embodiments, the reference portion of the scheduler entry is used for storing a reference to the opcode table entry where the second opcode is stored.

In some embodiments, when picking each of the compressed micro-operations from a single scheduler entry, the picker logic picks the micro-operations in a specified order. Generally, the picker logic picks the information for a first micro-operation of the pair of micro-operations from the single scheduler entry and forwards the first micro-operation for execution by an execution unit in a given cycle of a controlling clock. The picker logic then picks the information for a second micro-operation of the pair of micro-operations from the single scheduler entry and forwards the second micro-operation for execution by the execution unit in a cycle of the controlling clock subsequent to the given cycle. In some embodiments, the picker waits until both of the compressed micro-operations in a single scheduler entry are ready for execution (e.g., the operands are available for both micro-operations or the operands are available for the first micro-operation of the pair of micro-operations and the second micro-operation is only awaiting operands that will be produced by the first micro-operation) before picking both micro-operations in consecutive clock cycles. For these embodiments, the picker is able to simply pick the first and second micro-operations in consecutive cycles of the controlling clock, but waits for the operands for both the first and second micro-operations to be ready before forwarding the first and second micro-operations for execution. In other embodiments, however, the picker picks the first micro-operation of the pair of compressed micro-operations from the single scheduler entry as soon as the first micro-operation's operands are ready and then subsequently picks the second micro-operation of the pair of compressed micro-operations from the single scheduler entry when the second micro-operation's operands are ready. For these embodiments, the picker may be able to forward the first micro-operation to the execution units for execution earlier, but performs two separate checks of the readiness of the operands for the first and second micro-operations.

By storing information for a pair of micro-operations in a single scheduler entry, the described embodiments can store more micro-operations in a given number of scheduler entries in a processor (in comparison to existing systems that do not compress micro-operations in scheduler entries). This enables a higher dispatch rate for micro-operations from the micro-operation queue and avoids dispatch stalls, which can keep the execution units busier. Keeping the execution units busier in turn improves the operation of the processor, which improves user satisfaction with the processor.

Electronic Device

In the described embodiments, an electronic device performs operations for compressing pairs of micro-operations into single scheduler entries. FIG. 1 presents a block diagram illustrating electronic device 100 in accordance with some embodiments. As can be seen in FIG. 1, electronic device 100 includes processor 102 and memory 104. Processor 102 and memory 104 are implemented in "hardware," i.e., using corresponding circuitry. For example, in some embodiments, processor 102 and memory 104 are entirely fabricated in integrated circuitry on one or more semiconductor chips, possibly on one or more separate semiconductor chips, are fashioned from semiconductor chips in combination with discrete circuitry, or are fabricated from discrete circuitry alone.

Processor 102 is a functional block that performs operations for instruction execution, memory access, etc. in electronic device 100. For example, processor 102 can be or include one or more central processing units (CPUs), graphics processing units (GPUs), application specific integrated circuits (ASICs), field programmable gate arrays (FPGAs), and/or other processing mechanisms that execute program code instructions for applications, operating systems, firmware, etc.

Memory 104 is functional block that performs operations of a memory (e.g., a "main" memory) in electronic device 100. Memory 104 includes memory circuitry such as fourth-generation double data rate synchronous DRAM (DDR4 SDRAM) memory circuitry for storing copies of instructions and data for use by the other functional blocks in electronic device 100 and control circuitry for storing, accessing, etc. copies of instructions and data in the memory circuitry and for performing other control or configuration operations. In some embodiments, copies of instructions and data are retrieved (e.g., in 4 kB blocks or "pages") from a storage device in electronic device 100 such as a disk or a high-capacity non-volatile semiconductor memory (not shown) and stored in memory 104 for use by functional blocks in electronic device 100.

Electronic device 100 is simplified for illustrative purposes. In some embodiments, however, electronic device 100 includes additional or different functional blocks, subsystems, and/or elements. For example, electronic device 100 may include display subsystems, power subsystems, input-output (I/O) subsystems, human interface subsystems, one or more cache memories external to processor 102, etc. In addition, although electronic device 100 is shown with certain functional blocks and elements, in some embodiments, electronic device 100 includes different functional blocks or elements. For example, electronic device 100 can include two or more processors, etc. Generally, in the described embodiments, electronic device 100 includes sufficient functional blocks and elements to perform the operations described herein.

Electronic device 100 can be, or can be included in, any device that performs the operations described herein. For example, electronic device 100 can be, or can be included in, a desktop computer, a laptop computer, a wearable computing device, a tablet computer, a piece of virtual or augmented reality equipment, a smart phone, an artificial intelligence (AI) or machine learning device, a server, a network appliance, a toy, a piece of audio-visual equipment, a home appliance, a vehicle, etc., and/or combinations thereof.

Processor

Figure 2:
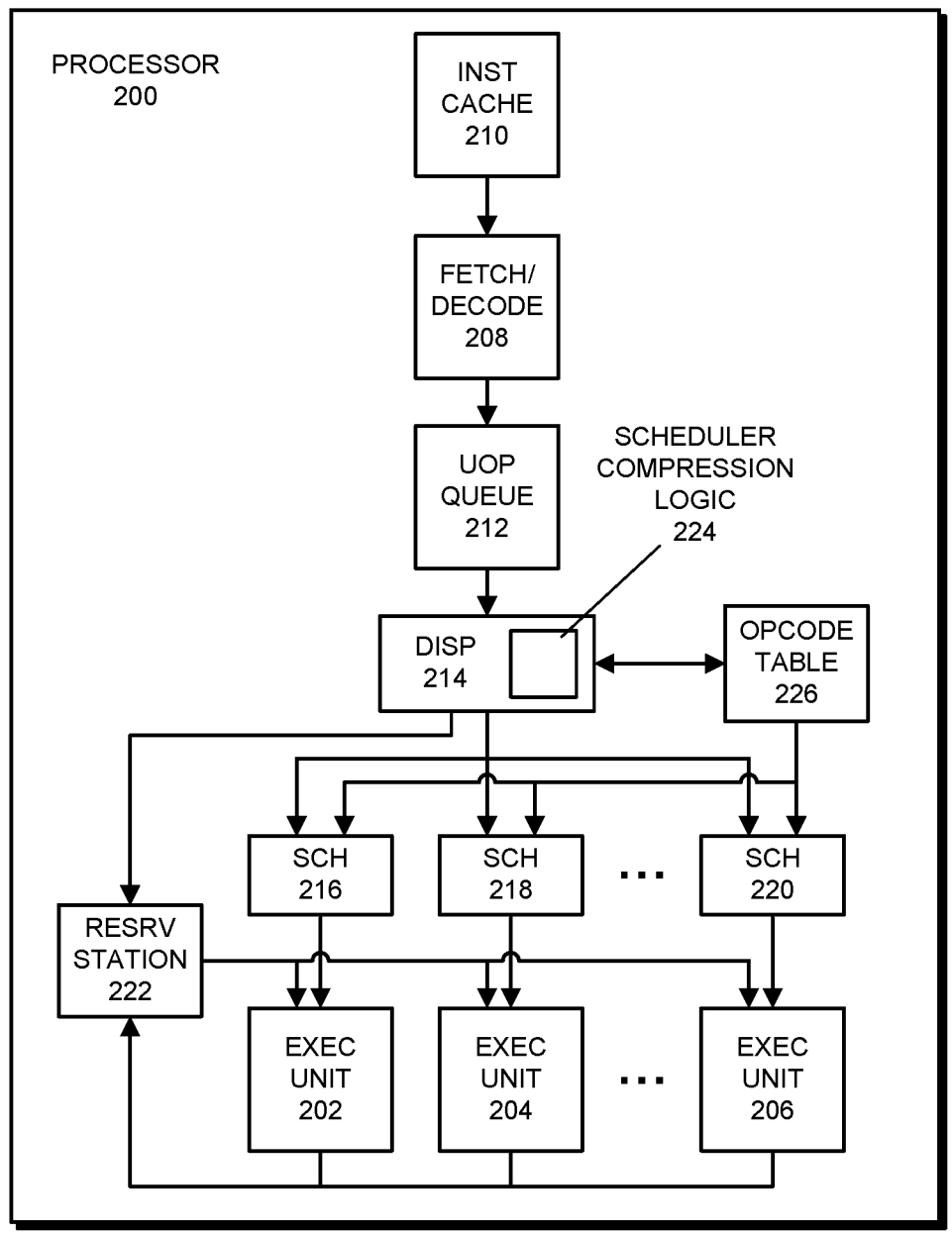
FIG. 2 presents a block diagram illustrating a processor in accordance with some embodiments.

In the described embodiments, an electronic device (e.g., electronic device 100) includes a processor that performs operations for compressing pairs of micro-operations into single scheduler entries. FIG. 2 presents a block diagram illustrating a processor 200 in accordance with some embodiments. In some embodiments, processor 102 includes similar functional blocks to those shown in processor 200, i.e., is internally arranged similarly to processor 102.

As shown in FIG. 2, processor 200 includes execution (EXEC) units 202-206, each of which is a functional block that includes circuitry for executing micro-operations. For example, each of execution units 202-206 can include execution pipelines, compute units, FPGAs, and/or other micro-operation execution circuitry that processes micro-operations and performs corresponding operations.

In some embodiments, some or all of execution units 202-206 are arranged for, and possibly dedicated to, executing particular types of micro-operations. For example, in some embodiments, execution unit 202 is a simpler integer execution unit that includes circuitry that is arranged for executing simpler micro-operations from among a set of micro-operations supported by processor 200 (e.g., simpler logic micro-operations, simpler mathematical micro-operations, micro-operations that can be executed in only a few cycles of a controlling clock, etc.), execution unit 204 is a more complex integer execution unit that includes circuitry arranged for executing more complex micro-operations from among a set of micro-operations supported by processor 200 (e.g., more complex logic micro-operations, more complex mathematical micro-operations, micro-operations that need more than a few cycles of a controlling clock to execute, etc.), and execution unit 206 is a floating point execution unit that includes circuitry that is arranged for executing floating point micro-operations.

Fetch/decode 208 is a functional block that includes circuitry for fetching program code instructions (or groups thereof) from instruction cache 210 and decoding fetched the instructions into micro-operations. After decoding micro-operations, fetch/decode 208 stores the micro-operations in micro-operation (UOP) queue 212. Micro-operation queue 212 is a functional block that includes circuitry for a number of entries, each entry having storage element circuitry for storing a micro-operation (i.e., for storing an opcode, source/destination register identifiers, immediate values, etc. for the micro-operation). From micro-operation queue 212, micro-operations are sent to dispatch 214.

Dispatch (DISP) 214 is a functional block that includes circuitry for selecting schedulers from among schedulers 216-220 to which micro-operations are to be sent and sending the micro-operations to the selected schedulers. As described above, in some embodiments, some or all of execution units 202-206 are arranged, and possibly dedicated to, processing particular types of instructions. In these embodiments, schedulers 216-220 will ordinarily only handle instructions of the type to be processed by the respective execution unit. For example, if execution unit 202 is arranged for executing simpler micro-operations, scheduler 216, which services execution unit 202, will ordinarily only handle simpler micro-operations. In some embodiments, therefore, the above-described selecting operation involves dispatch 214 selecting a scheduler that handles each micro-operation based on a type of that micro-operation. In addition, in some embodiments, dispatch 214 selects schedulers to which micro-operations are sent in view of the possibility of compressing the micro-operations into single scheduler entries, as described in more detail below.

Figure 3:
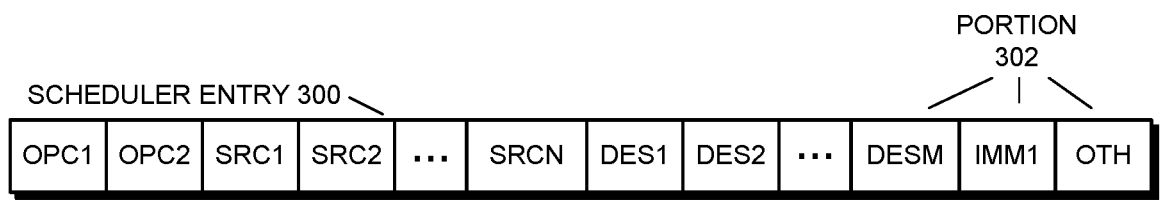
FIG. 3 presents a block diagram illustrating a scheduler entry in accordance with some embodiments.

Schedulers (SCH) 216-220 are functional blocks that include circuitry for storing micro-operations in scheduler entries (e.g., scheduler entries in respective scheduler queues). Each scheduler entry includes storage elements (e.g., memory circuits, registers, flip-flops, etc.) for storing information for micro-operations in different portions. In other words, each scheduler entry includes storage elements for storing a number of bits that identify, indicate, or represent each piece of information that may be included in a micro-operation in accordance with the architecture of the processor. For example, in some embodiments, the architecture of the processor includes one or more "full" micro-operations that include the maximum permissible micro-operation information and each storage entry includes sufficient portions for storing a full micro-operation. As another example, in some embodiments, certain micro-operations have maximum permissible information for particular pieces of information (e.g., a maximum allowable/usable number of source registers, etc.) and each scheduler entry includes sufficient portions for storing any micro-operation. FIG. 3 presents a block diagram illustrating a scheduler entry 300 in accordance with some embodiments. As can be seen in FIG. 3, scheduler entry 300 includes portions (three of which are labeled as portion 302) for storing two opcodes (OPC1 and OPC2), N source register identifiers (SRC1-SRCN), M destination register identifiers (DES1-DESM), an immediate value, and other (OTH) information (e.g., metadata, etc.). Note that the portions of scheduler entry are an example of some embodiments, but in other embodiments scheduler entry 300 includes different and/or differently-arranged portions. For example, in some embodiments, scheduler entry 300 includes fewer source and/or destination register identifiers (i.e., one or two source or destination register identifiers), includes only one opcode, includes a reference portion for storing references to opcode table entries, etc. In addition, in some embodiments, scheduler entries 300 in some or all of schedulers 216-220 include different information. For example, in some embodiments, schedulers 216-220 support different types or formats of micro-operations—and the respective scheduler entries 300 include corresponding information. Generally, in the described embodiments, each scheduler entry includes sufficient portions for storing micro-operations—or a pair of compressed micro-operations—as described herein.

Although "scheduler entries" are referred to in describing operations of the described embodiments, in some embodiments at least some information for micro-operations is stored elsewhere in processor 200. For example, in some embodiments, operands are stored in reservation station 222, as is described below. In some of these embodiments, the compression of pairs of micro-operations into a single scheduler entry can include configuring other functional blocks in processor 200 for storing such information for pairs of micro-operations together. In some embodiments, storage circuitry and/or control circuitry in the other functional blocks are enhanced (e.g., provided with extra storage space, increased lookup circuitry, etc.) in order to handle storing, accessing, and otherwise using the additional information for compressed pairs of micro-operations.

In addition to scheduler entries, each of schedulers 216-220 includes picker logic circuitry that picks (i.e., retrieves, acquires, etc.) micro-operations from the scheduler entries and sends the picked micro-operations for processing in the respective execution unit. For example, in some embodiments, assuming that micro-operations are available in scheduler entries, the picker logic picks micro-operations from the scheduler entries and sends the picked micro-operations to the respective execution unit at a rate that is dictated by the availability of the respective execution unit for executing the picked micro-operations. For example, a maximum rate for executing micro-operations in an execution unit may be K micro-operations per cycle of a controlling clock (where K=1, 0.5, or another number) and thus the picker can pick and send micro-operations at a rate of K micro-operations per cycle of the controlling clock (or 1/K cycles of the controlling clock per micro-operation).

Reservation (RESRV) station 222 is a functional block that includes circuitry for storing operands to be used for executing micro-operations by execution units 202-206. The reservation station holds, in reservation station entries, values of operands that are produced by an execution unit, which enables the operands to be immediately reused for executing subsequent micro-operations (as soon as the operands are output from execution circuitry), rather than waiting for values of operands to be written to processor registers and then read out. In some embodiments, entries in reservation station 222 are associated with individual scheduler entries—and therefore hold operands for micro-operations in the individual scheduler entries. In some embodiments, the entries in the reservation station include sufficient storage elements for storing all permitted combinations of operands for full micro-operations, which are also used for storing operands for pairs of compressed micro-operations stored in single scheduler entries.

Returning to dispatch 214, dispatch 214 includes or is associated with scheduler compression logic 224. Scheduler compression logic 224 is a functional block that includes circuitry for selecting pairs of micro-operations to be compressed in scheduler entries. Scheduler compression logic 224 includes selection logic circuitry that monitors micro-operations in micro-operation queue 212 to find pairs of micro-operations that are compressible in accordance with one or more compressibility rules.

In some embodiments, scheduler compression logic 224 includes one or more tables or other records of compressibility rules that are used for selecting pairs of micro-operations in the micro-operation queue to be compressed. In some of these embodiments, the compressibility rules are statically configured and fixed, and are "hard coded" into the tables or other records. For example, circuitry in the selection logic may be configured to implement specified compressibility rules. In some of these embodiments, however, the compressibility rules are configurable during operation of processor 200. For example, the selection logic circuitry may read configuration files specifying the compressibility rules or otherwise acquire the compressibility rules and may create or update the tables or other records.

Scheduler compression logic 224 also includes micro-operation compression logic that acquires selected pairs of micro-operations from the micro-operation queue (e.g., when the micro-operations are dispatched from the micro-operation queue) and stores information from both micro-operations of the pair of micro-operations into different portions in a single scheduler entry. In other words, the micro-operation compression logic, when a pair of micro-operations is compressible in accordance with the compressibility rules, retrieves or otherwise receives the information from the pair of micro-operations from micro-operation queue 212 (e.g., opcodes, source and/or destination register identifiers, etc.) and stores information from the micro-operations in the pair of micro-operations into portions of a single scheduler entry. In some of these embodiments, instead of performing the acquiring and storing operations itself, the micro-operation compression logic causes dispatch 214 or another functional block to perform the actual acquiring and storing operations for storing the information from the pair of micro-operations into a single scheduler entry.

In some embodiments, one of the compressibility rules is that micro-operations should be directed to a same scheduler in order to be compressed. In other words, in these embodiments, in order to be candidates for compression, a given pair of micro-operations should be sent by dispatch 214 to a single scheduler. In some of these embodiments, dispatch 214 selects the particular scheduler to which micro-operations are directed so that scheduler compression logic 224 is more likely to be able to compress pairs of micro-operations. In other words, in some embodiments, dispatch 214 checks micro-operations and selects a scheduler to which micro-operations are to be sent in view of the possibility that the micro-operations may be compressed into single scheduler entries in that scheduler. In some of these embodiments, dispatch 214 restricts the schedulers to which micro-operations might be directed (i.e., using a baseline scheduler algorithm) to the union of the schedulers that may be used for pairs of micro-operations or simply chooses to send micro-operations to particular schedulers in order to increase the probability that the micro-operations will be compressed. In some of these embodiments, dispatch 214 chooses a scheduler in view of both compression of micro-operations and scheduler utilization, so that micro-operations are generally sent to less-busy schedulers for possible compression.

In some embodiments, dispatch 214 also marks micro-operations as eligible for compression and the marks are sent to scheduler compression logic 224. In these embodiments, therefore, dispatch 214 participates in compression operations by providing information to scheduler compression logic 224 that identifies pairs of micro-operations (or other groups of micro-operations) as eligible for compression.

Scheduler compression logic 224 then, as part of attempting to compress pairs of micro-operations, checks for such marks associated with micro-operations when determining pairs of micro-operations to be compressed.

Processor 200 also includes opcode table 226. Opcode table 226 is a functional block that includes circuitry for storing opcode information for pairs of micro-operations that have been compressed into single scheduler entries. In some embodiments, opcodes for both micro-operations in compressed pairs of micro-operations are stored in entries in the opcode table. In these embodiments, the scheduler entries may include only a single opcode portion—and the opcode portion can include, for compressed pairs of micro-operations, a pointer or reference to the entry in opcode table 226 where the opcodes for the compressed pairs of micro-operations are stored. In these embodiments, when acquiring information for compressed pairs of micro-operations, the picker logic in each scheduler uses the pointer or reference in the single scheduler entry to read the opcodes for both micro-operations from opcode table 226—and assembles an executable micro-operation from a combination of the opcodes and the information in a scheduler entry. In some embodiments, however, one of the opcodes for each compressed pair of micro-operations is stored in the scheduler entry (i.e., in a single opcode portion in the scheduler entry) and the other is stored alone in an entry in opcode table 226. In these embodiments, the scheduler entry includes a reference portion in which a pointer to or reference for the entry in the opcode table is stored. In these embodiments, when acquiring information for compressed pairs of micro-operations, along with reading the opcode for one of the micro-operations from the single scheduler entry, the picker logic in each scheduler uses the pointer or reference in the single scheduler entry to read the opcode for the other micro-operation from opcode table 226.

By using opcode table 226, an increase in size and complexity of scheduler entries for storing both opcodes for compressed pairs of micro-operations can be avoided. In other words, in contrast to scheduler entry 300 as shown in FIG. 3, embodiments in which opcode table 226 is included can have relatively smaller scheduler entries because at least one opcode for compressed pairs of micro-operations is not stored in scheduler entries. Note, however, that opcode table 226 is optional—and is therefore not present in some embodiments. In some embodiments, scheduler entries include portions for storing both opcodes in compressed pairs of micro-operations.

In some embodiments, opcode table 226 has only a limited number of entries (e.g., 16, 20, or another number of entries). In these embodiments, when all of the entries in opcode table 226 are full of/storing opcodes for compressed micro-operations that are presently stored in scheduler entries (and thus awaiting execution), no further micro-operations can be compressed in scheduler entries. When a given compressed pair of micro-operations is executed, however, the respective entry in opcode table 226 is freed for subsequent use in storing opcodes for compressed pairs of micro-operations—and micro-operation compression can resume. In some embodiments, a set of tokens and/or another accounting system is used for handling the use of entries in opcode table 226.

In some embodiments, the picker logic in each of schedulers 216-220 separately picks micro-operations for compressed pairs of micro-operations from the scheduler entries. In these embodiments, the picker logic acquires information for a first micro-operation of a compressed pair of micro-operations from a single scheduler entry and forwards the first micro-operation to the respective execution unit for execution in a cycle of a controlling clock. The picker logic then picks information for a second micro-operation of the pair of micro-operations from the single scheduler entry and forwards the second micro-operation to the respective execution unit for execution in a subsequent cycle of the controlling clock (e.g., a next cycle of the controlling clock, a later cycle of the controlling clock, etc.). In this way, despite being stored together in a single scheduler entry, the information for each micro-operation is kept separate and used for individually picking and executing the micro-operations in compressed pairs of micro-operations. The described embodiments therefore differ from "fusion" operations in existing electronic devices in which pairs of micro-operations are fused. This is true because for fusion two or more micro-operations are replaced with a single micro-operation that performs the combined operations of the two or more micro-operations.

In some embodiments, the picker logic in each of schedulers 216-220 waits for the operands (and possibly other instruction inputs and execution resources) for both of a compressed pair of micro-operations to be ready (e.g., in reservation station 222) before picking/acquiring the micro-operations from the compressed pair of micro-operations and forwarding the picked micro-operations to the respective execution unit. In some of these embodiments, the picker logic first checks to determine that all source operands for both the first and second micro-operations of a compressed pair of micro-operations are available. The picker logic then picks the information for the first micro-operation and then the second micro-operation from the single scheduler entry in two or more cycles of a controlling clock (e.g., in consecutive cycles of a controlling clock). In this way, the picker logic need only check that the source operands for both micro-operations are ready and then can pick both of the pair of micro-operations without again checking for the readiness of the operands for the second micro-operation. By checking for the source operands during a single check (in contrast to making two separate checks) these embodiments can conserve electrical power.

In some embodiments, the picker logic in each of schedulers 216-220 checks the source operands (and possibly other instruction inputs and execution resources) for the first micro-operation of a compressed pair of micro-operations and picks the first micro-operation when the first micro-operation's source operands are ready—without regard as to whether the source operands for the second micro-operation of the compressed pair of micro-operations are ready. The picker logic then later (e.g., in a subsequent cycle of the controlling clock) checks the source operands (and possibly other instruction inputs and execution resources) for the second micro-operation and picks the second micro-operation when the first micro-operation's source operands are ready. In this way, the picker logic can pick the first micro-operation more quickly than in embodiments where the picker waits for the input operands for both micro-operations to be ready before picking both micro-operations (such as is described above), albeit at the cost of making extra check of the source operands for the second micro-operation.

Processor 200 is shown in FIG. 2 with various functional blocks in order to provide an illustrative framework for the particular functional blocks and operations performed thereby for the described embodiments. Processor 200 is, however, simplified for illustrative purposes—and for clarity and brevity in describing some embodiments. In some embodiments, processor 200 includes other types and arrangements of functional blocks that are not shown in FIG. 2. For example, in some embodiments, processor 200 includes one or both of a level one (L1) data cache functional block and an L2 cache functional block, a branch prediction unit functional block, an instruction reordering functional block, a retire unit functional block, a program counter functional block, etc. As another example, in some embodiments, processor 200 includes a different number of execution units and respective schedulers—or includes only a single unified scheduler. As yet another example, in some embodiments, processor 200 includes functional blocks similar to typical multi-core CPUs, with multiple processor cores, interconnects, caches, etc. In these embodiments, functional blocks similar to the functional blocks shown in FIG. 2 may be present in each of the multiple processor cores. Generally, in the described embodiments, processor 200 includes sufficient functional blocks to perform the operations described herein.

Although scheduler compression logic 224 is described as performing various operations for compressing pairs of micro-operations into single scheduler entries, in some embodiments, other functional blocks perform some or all of the operations. For example, dispatch 214 and/or schedulers 216-220 can perform some or all of the operations. Generally, in the described embodiments, processor 200 includes circuitry in one or more functional blocks for performing operations for compressing micro-operations into single scheduler entries as described herein.

Compressibility Rules

In the described embodiments, compressibility rules are used for determining whether pairs of micro-operations can be compressed into single scheduler entries. Generally, the compressibility rules are rules, guidelines, etc. that are to be used for identifying pairs of micro-operations that can (or cannot) be stored together in a single scheduler entry. The compressibility rules in use in a given processor depend on the arrangement and portions available in scheduler entries and the ability of picker circuitry, execution circuitry, etc. to handle pairs of micro-operations from single scheduler entries. The following paragraphs present a number of examples of compressibility rules.

In some embodiments, the compressibility rules limit the micro-operations that can be stored together in a single scheduler entry to micro-operations that can be executed consecutively (e.g., in consecutive cycles of a controlling clock, in order, etc.) from a scheduler entry in a given scheduler. For example, in some embodiments, a compressibility rule is that a candidate pair of micro-operations should be adjacent in the micro-operation queue, i.e., with no intervening micro-operations. As another example, in some embodiments, a compressibility rule is that both micro-operations of a candidate pair of micro-operations are directed to a same scheduler from among two or more scheduler (e.g., schedulers 216-220). For instance, when different types of micro-operations are directed to different schedulers, such as in the example above of schedulers 216-220. As yet another example, in some embodiments, a compressibility rule is that a candidate pair of micro-operations should be able to be picked and executed from the same scheduler entry in accordance with micro-operation execution ordering rules.

In some embodiments, the compressibility rules limit the micro-operations that can be stored together in single scheduler entries based on the information that is present in the micro-operations. In some embodiments, a compressibility rule is that specified information from both micro-operations in a candidate pair of micro-operations can be stored in different portions in a single scheduler entry at the same time. In other words, the specified information (e.g., opcodes, source and destination register identifiers, etc.) for each micro-operation of the candidate pair of micro-operations will fit in the available portions of a single scheduler entry at the same time. Note that, in some embodiments, processor 200 includes additional functional block(s) that are used for storing specified information from compressed micro-operations (e.g., opcode table 226 is used for storing opcode information for compressed pairs of micro-operations). In some of these embodiments, a compressibility rule is that all information from a candidate pair of micro-operations must fit in the combination of a scheduler entry and the additional functional block(s).

In some embodiments, the compressibility rules limit the micro-operations that can be stored together in a single scheduler entry to micro-operations for which flag accesses and/or other processor actions can be correctly performed. In some embodiments, a compressibility rule is that only one read access and one write access of a given flag register can be made by the micro-operations in a candidate pair of micro-operations.

Compressing Pairs of Micro-Operations in Scheduler Entries

Figure 4:
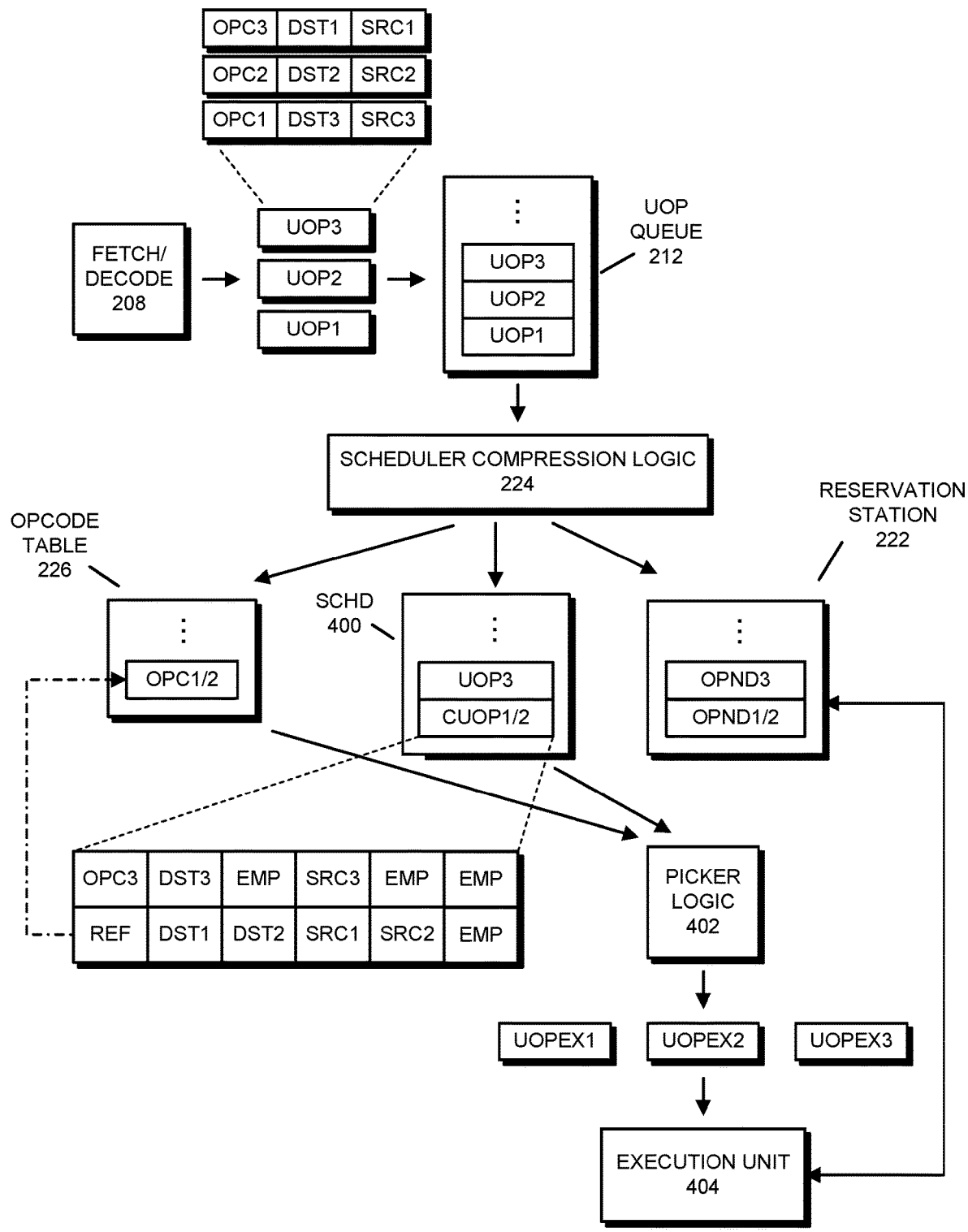
FIG. 4 presents a block diagram illustrating compressing a pair of micro-operations into a single scheduler entry in accordance with some embodiments.

In the described embodiments, scheduler compression logic (e.g., scheduler compression logic 224) performs operations for compressing pairs of micro-operations into single scheduler entries, i.e., for storing information associated with both of pairs of micro-operations into different portions of single scheduler entries. FIG. 4 presents a block diagram illustrating compressing a pair of micro-operations into a single scheduler entry in accordance with some embodiments. Note that the operations shown in FIG. 4 are presented as a general example of operations performed by some embodiments. The operations performed by other embodiments include different operations, operations that are performed in a different order, and/or operations that are performed by different entities or functional blocks. For example, a number of operations that are described as being performed by scheduler compression logic 224 may instead be performed by a dispatch functional block (e.g., dispatch 214), possibly at the request of or under the control of scheduler compression logic 224.

For the example in FIG. 4, three micro-operations, UOP1-UOP3, are processed as shown in FIG. 4. As can be seen in the expanded element along the top of FIG. 4, each of UOP1-UOP3 includes an opcode (OPC1-OPC3), a destination register identifier (DST1-DST3), and a source register identifier (SRC1-SRC3). Although micro-operations with particular information are used for the example in FIG. 4, the described embodiments are operable with micro-operations that include additional and/or different information. Generally, the described embodiments can compress any pairs of micro-operations that meet compressibility rules as described herein.

For the example in FIG. 4, it is assumed that scheduler entries are able to store two source register identifiers and two destination register identifiers. In other words, the scheduler entries include sufficient portions to separately and simultaneously store identifiers for these registers in different portions of the scheduler entries. The scheduler entries are also assumed not to have sufficient portions for storing both opcodes for compressed pairs of micro-operations. In other words, for the example in FIG. 4, the scheduler entries include only a portion for storing one opcode (which would otherwise used for storing opcodes for single uncompressed micro-operations). Instead, opcode table 226 is used for storing both opcodes for compressed pairs of micro-operations. The opcode portions of the scheduler entries are used for storing pointers or references to entries in opcode table 226 where both of the opcodes for compressed pairs of micro-operations are stored. Although a single-opcode embodiment of scheduler entries is used for the example in FIG. 4, in some embodiments, scheduler entries include sufficient portions for storing both opcodes. In these embodiments, opcode table 226 may not be used—and may not even be present in processor 200.

The example in FIG. 4 starts when a fetch/decode 208 functional block acquires one or more program code instructions (not shown) and decodes the one or more instructions into the three micro-operations UOP1-UOP3. Fetch/decode 208 then stores the three micro-operations UOP1-UOP3 in three consecutive entries in micro-operation queue 212. In other words, the micro-operations are stored in three neighboring/adjacent entries in micro-operation queue 212 in the order UOP1, UOP2, and UOP3.

After UOP1-UOP3 are stored in micro-operation queue 212, scheduler compression logic 224 checks micro-operations in micro-operation queue 212 to determine whether any pair of the micro-operations can be compressed in a single scheduler entry. For this operation, scheduler compression logic 224 examines pairs of the micro-operations, e.g., UOP1 and UOP2, to determine whether that pair of micro-operations is compressible in accordance with compressibility rules. As described elsewhere herein, the compressibility rules include one or more rules to be used for identifying pairs of micro-operations that can (or cannot) be stored together in a single scheduler entry. For the example in FIG. 4, it is assumed that UOP1 and UOP2 meet the compressibility rules and therefore can be compressed into a single scheduler entry.

Because UOP1 and UOP2 can be compressed, upon dispatch of UOP1 and UOP2 to scheduler 400, scheduler compression logic 224 compresses UOP1 and UOP2 into a single scheduler entry in scheduler (SCHD) 400 by storing information for both of UOP1 and UOP2 into the single scheduler entry. For example, in some embodiments, scheduler 400 includes a scheduler queue functional block with a number of scheduler entries and scheduler compression logic 224 stores information for both UOP1 and UOP2 into a single entry in the scheduler queue. Scheduler compression logic 224 also stores opcodes for both UOP1 and UOP2 in an entry in opcode table 226 (shown as OPC1/2) and stores a reference to the entry in opcode table 226 into the single scheduler entry. Scheduler compression logic 224 additionally configures reservation station 222 to use a single reservation station entry for storing operands for both UOP1 and UOP2 (shown as OPND1/2). In some embodiments, following these operations, the single scheduler entry appears as shown in the expanded view in the lower left of FIG. 4. As can be seen in the expanded view (and as is indicated by the dash-dot line), the reference to the entry in the opcode table (REF) is stored in a first portion of the scheduler entry (which would otherwise be used for storing an opcode for an uncompressed micro-operation). Destination register identifiers (DST1 and DST2) for UOP1 and UOP2, respectively, are stored in the next two portions. Source register identifiers (SRC1 and SRC2) for UOP1 and UOP2, respectively, are stored in the next two portions. An immediate portion is shown as empty (EMP) because neither of UOP1 or UOP2 includes an immediate value. Note that the scheduler entry is presented as an example; different embodiments may have more or different portions.

In some embodiments, along with storing the information for UOP1 and UOP2 in the single scheduler entry, scheduler compression logic 224 sets metadata to indicate that a pair of micro-operations has been compressed in the single scheduler entry (and possibly sets respective metadata in other functional blocks, such as in reservation station 222). For example, in some embodiments, each scheduler entry is associated with a compressed bit in metadata for that scheduler entry that can be set to 1 to indicate that a compressed pair of micro-operations has been stored in that scheduler entry and cleared to 0 to indicate that a single micro-operation is stored in that scheduler entry. In some embodiments, when picking micro-operations for execution, picker logic 402 in the scheduler uses the metadata to determine whether a compressed pair of micro-operations are stored in each scheduler entry—and handles the picking of micro-operations accordingly. As another example, in some embodiments, each scheduler entry is associated with a set of type bits in metadata for that scheduler entry that can be set to indicate the types of one or both micro-operations of a pair of compressed micro-operations stored in that scheduler entry.

In some of the embodiments in which opcode table 226 is used for storing opcodes for compressed pairs of micro-operations, opcode table 226 has a limited number of entries and may become full of opcodes for compressed pairs of micro-operations. In these embodiments, a system of tokens (or another form of accounting) may be used to control when opcodes are written to opcode table 226. For example, as the scheduler compression logic stores one or more opcodes in each opcode table entry, a token is removed from a token pool (i.e., a group of available tokens which may be implemented using a simple counter) for opcode table 226 and, when the opcodes are subsequently picked by picker, the token is restored to the token pool. When the token pool is empty (has zero tokens), opcode table 226 is full and no more pairs of micro-operations can be compressed in scheduler entries until an opcode table entry is freed (i.e., when the existing opcodes are picked by the picker). Micro-operations continue, however, to be dispatched to the scheduler, albeit without compression.

Because UOP1 and UOP2 are compressed, and micro-operations are compressed as pairs, UOP3 will not be compressed (note that, if the example in FIG. 4 were to continue with subsequent micro-operations, UOP3 might turn out to be compressible with a subsequent micro-operation, but that is beyond the scope of the example in FIG. 4). Scheduler compression logic 224 therefore stores UOP3 alone in a second scheduler entry. Scheduler compression logic 224 also configures reservation station 222 to use a reservation station entry for storing operands for UOP3 (shown as OPND3). In some embodiments, following these operations, the second scheduler entry appears as shown in the expanded view in the lower left of FIG. 4. As can be seen there, the opcode for UOP3, OPC3, is stored in the first/opcode portion of the second scheduler entry and the destination and source register identifiers for UOP3 (DST3 and SRC3) are stored in respective portions. Portions of the second scheduler entry in which information is not stored because UOP3 does not have information to be stored in these portions are shown as empty (EMP). Note that the second scheduler entry is presented as an example; different embodiments may have more or different portions.

Picker logic 402 in the scheduler next determines whether the operands for UOP1 and UOP2 are ready in reservation station 222 (e.g., if the operands have been output from previous operations of execution (EXE) unit 404, etc.) and possibly if other inputs and processor execution resources are ready. If so, picker logic separately picks UOP1 and UOP2 from the single scheduler entry (e.g., in consecutive cycles of a controlling clock) and forwards UOP1 and UOP2 to execution unit 404 for execution. As part of this operation, picker logic 402 uses the reference (REF) in the single scheduler entry to determine the entry in opcode table 226 where the opcodes for UOP1 and UOP2 are stored. Picker logic 402 then acquires the opcodes from opcode table 226 to be used along with the other information from the single scheduler entry for executing UOP1 and UOP2. Execution unit 404 then separately executes each of UOP1 and UOP2. For example, execution unit 404 may execute UOP1 in a given cycle of a controlling clock and then execute UOP2 in a next or subsequent cycle of a controlling clock.

Picker logic 402 then determines whether the operands for UOP3 are ready in reservation station 222 and possibly if other inputs and processor execution resources are ready. If so, picker logic picks UOP3 from the second scheduler entry and forwards UOP3 to execution unit 404 for execution. Execution unit 404 then executes UOP3. For example, execution unit 404 may execute UOP3 in a cycle of the controlling clock after a cycle of the controlling clock in which UOP2 is executed.

Process for Compressing Micro-Operations into Single Scheduler Entries

Figure 5:
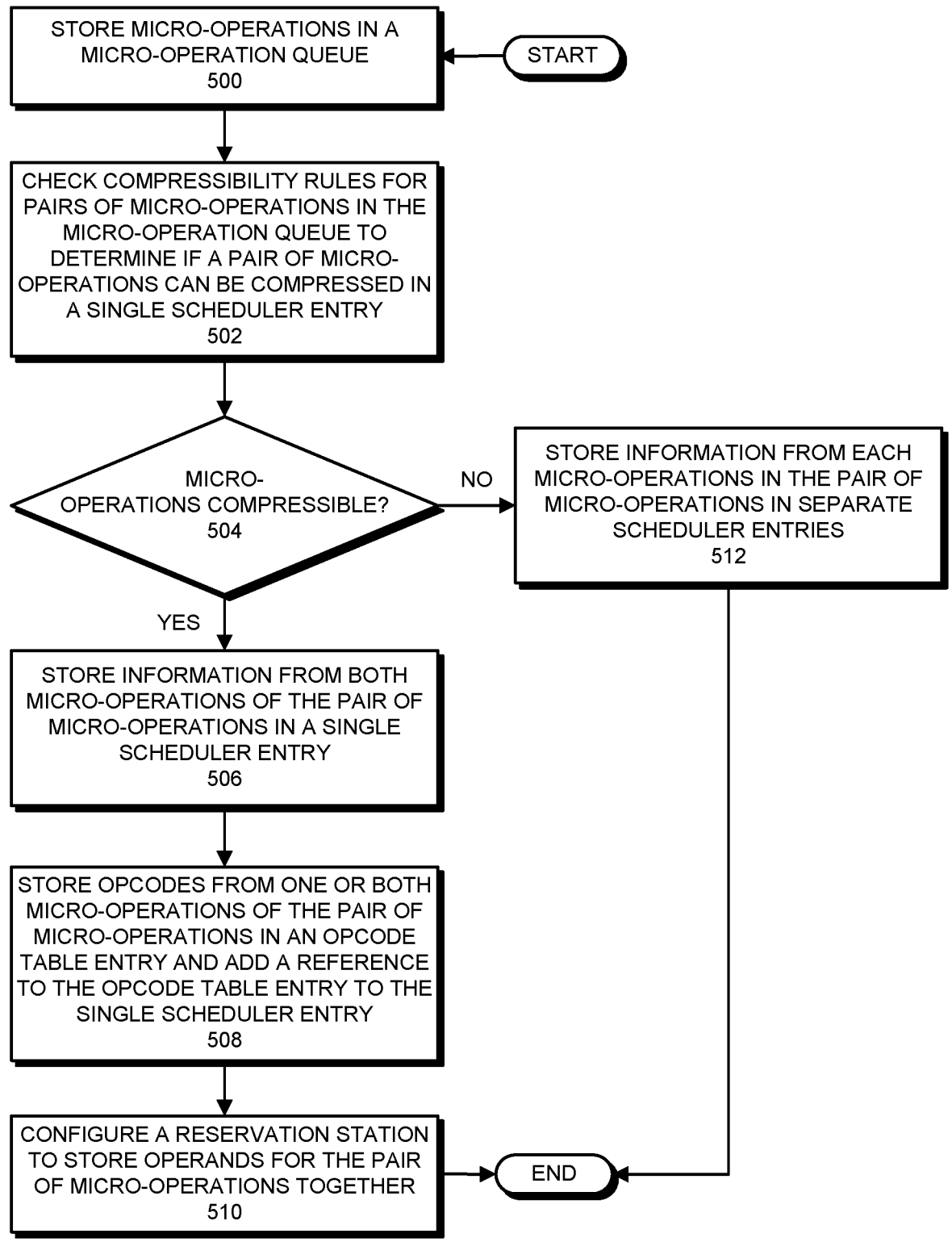
FIG. 5 presents a flowchart illustrating a process for compressing a pair of micro-operations in a single scheduler entry in accordance with some embodiments.

In the described embodiments, scheduler compression logic (e.g., scheduler compression logic 224) performs operations for compressing pairs of micro-operations into single scheduler entries. FIG. 5 presents a flowchart illustrating a process for compressing a pair of micro-operations in a single scheduler entry in accordance with some embodiments. Note that the operations shown in FIG. 5 are presented as a general example of operations performed by some embodiments. The operations performed by other embodiments include different operations, operations that are performed in a different order, and/or operations that are performed by different entities or functional blocks.

The operations in FIG. 5 start when a fetch/decode unit (e.g., fetch/decode 208) stores micro-operations in a micro-operation queue (e.g., micro-operation queue 212) (step 500). For this operation, the fetch/decode unit decodes the micro-operations from one or more program code instructions and stores the decoded micro-operations into entries in the micro-operation queue.

The scheduler compression logic then checks compressibility rules for pairs of micro-operations in the micro-operation queue to determine if a pair of micro-operations can be compressed into a single scheduler entry (step 502). Recall that the compressibility rules dictate which pairs of micro-operations are allowed to be compressed (or not allowed to be compressed) into single scheduler entries. This operation therefore includes the scheduler compression logic checking properties and characteristics of pairs of micro-operations in the micro-operation queue to determine whether the pairs of micro-operations can be compressed into single scheduler entries.

When a pair of micro-operations in the micro-operation queue are compressible (step 504), the scheduler compression logic stores information from both micro-operations of the pair of micro-operations in a single scheduler entry (step 506). For this operation, the scheduler compression logic stores the information for each micro-operation (e.g., destination register identifiers, source register identifiers, immediate values, etc.) into the available portions of the scheduler entry. For example, assuming that the scheduler entry has portions for storing two source register identifiers, and thus is capable of simultaneously storing two source register identifiers, and that each micro-operation of the pair of micro-operations has a single source register identifier, the scheduler compression logic can store the source register identifier for each micro-operation into specified source register identifier portions of the scheduler entry.

In some embodiments, where information for each micro-operation is stored (and eventually picked from) in the single scheduler entry is dictated by a type of the micro-operation (or at least the information that is present in each micro-operation). In these embodiments, the scheduler compression logic (and a picker) can use a type of the micro-operations, e.g., determined using respective opcodes or from examining the information in the micro-operation queue, to store (and pick) information from proper portions in the single scheduler entry. In some embodiments, along with storing the information in the single scheduler entry, the scheduler compression logic updates metadata associated with the single scheduler entry to indicate that the pair of micro-operations is stored in the single scheduler entry and/or the types of one or both of the pair of micro-operations stored in the single scheduler entry. For example, in some embodiments, the metadata for each scheduler entry includes two bits for each available portion that the scheduler compression logic can set to indicate whether the portion is: empty (00); stores information for the first micro-operation of the compressed pair of micro-operations (01); stores information for the second micro-operation of the compressed pair of micro-operations (10); or does not store information for a compressed micro-operation (11).

Along with storing information for the pair of micro-operations in the single scheduler entry, the scheduler compression logic stores opcodes from one or both micro-operations of the pair of micro-operations in an opcode table (e.g., in opcode table 226) entry and updates the single scheduler entry to include a reference to the opcode table entry (step 508). Recall that, in some embodiments, scheduler entries are limited to storing a single opcode. In some of these embodiments, the opcodes for both micro-operations of the pair of micro-operations are therefore stored in the opcode table and the reference is used by a picker for assembling the micro-operations as information for the pair of micro-operations is picked from the scheduler entry and opcode table entry. In some embodiments, however, scheduler entries include sufficient portions for storing both opcodes for a pair of compressed micro-operations—and the opcode table may be unused and not present. In addition, in some embodiments, the opcode table is used for storing one of the two opcodes for a pair of compressed micro-operations and scheduler entries include, along with a portion for storing one opcode, a reference portion in which references to the opcode table can be stored.

In addition, when compressing the pair of micro-operations into the single scheduler entry, the scheduler compression logic configures a reservation station to store operands for the pair of micro-operations together (step 510). For this operation, the scheduler compression logic causes the reservation station to store operands, or to set aside an entry to store operands, for the pair of micro-operations. In some embodiments, this operation involves storing operands separately in an entry in the reservation station that would ordinarily be used for storing operands for a single micro-operation (e.g., for a full micro-operation, etc.).

When the pair of micro-operations in the micro-operation queue are not compressible (step 504), the scheduler compression logic stores information from each of the micro-operations of the pair of micro-operations in separate scheduler entries (step 512). Note that this operation is the "typical" operation of the scheduler compression logic, in that a single micro-operation is stored in a single scheduler entry.

Processes for Picking Compressed Micro-Operations from a Scheduler Entry

Figure 6:
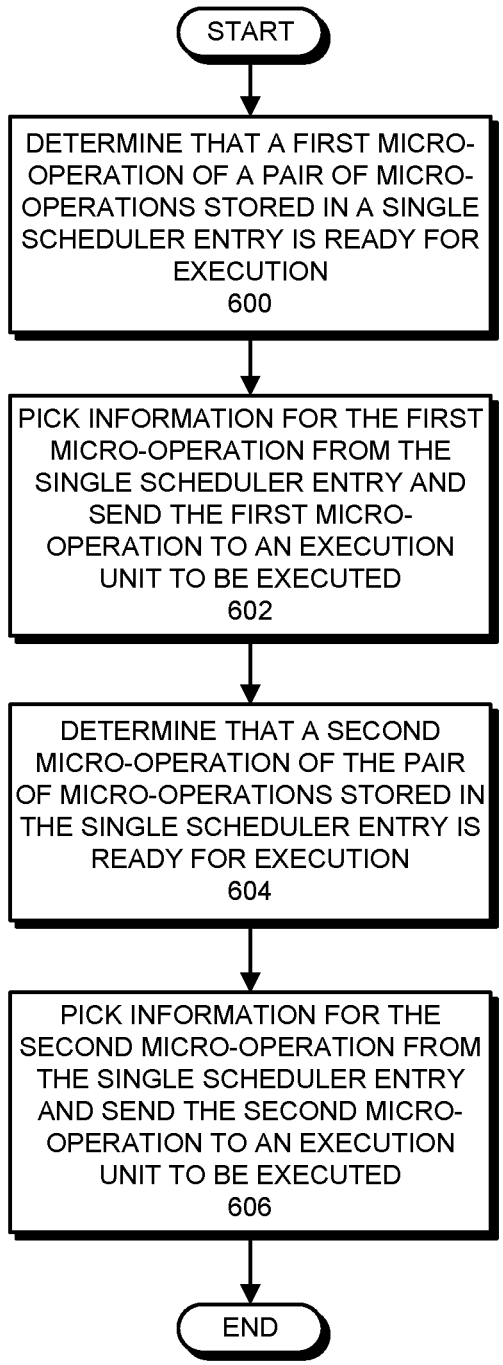
FIG. 6 presents a flowchart illustrating a process for picking a compressed pair of micro-operations from a single scheduler entry in accordance with some embodiments.

In the described embodiments, picker circuitry (e.g., picker logic 402) in a scheduler performs operations for picking information for compressed pairs of micro-operations from a single scheduler entry and sending each of the micro-operations to an execution unit (e.g., execution unit 404) to be executed. FIG. 6 presents a flowchart illustrating a process for picking a compressed pair of micro-operations from a single scheduler entry in accordance with some embodiments. Note that the operations shown in FIG. 6 are presented as a general example of operations performed by some embodiments. The operations performed by other embodiments include different operations, operations that are performed in a different order, and/or operations that are performed by different entities or functional blocks.

For the example in FIG. 6, the picker separately checks the readiness of each micro-operation of a pair of micro-operations that are compressed into a single scheduler entry and sends the micro-operations for execution when each is found to be ready. In other words, the picker checks the readiness of a first micro-operation of a pair of micro-operations stored in a single scheduler entry for execution and then sends the first micro-operation for execution when the first micro-operation is ready, without regard as to the readiness of the second micro-operation. The picker then checks the readiness of a second micro-operation of the pair of micro-operations stored in the single scheduler entry for execution and sends the second micro-operation for execution when the second micro-operation is ready. By separately checking the readiness of the micro-operations as described, the picker is able to more quickly send the first micro-operation for execution—or at least does not delay the execution of the first micro-operation based on the readiness of the second micro-operation.

For the example in FIG. 6, it is assumed that operations were previously performed to compress a pair of micro-operations into a single scheduler entry. For example, in some embodiments, the operations shown in FIG. 5 were performed. The single scheduler entry therefore includes information for each of the pair of compressed micro-operations in respective portions. In addition, the opcodes for both of the pair of compressed micro-operations are stored in an opcode table (e.g., opcode table 226)—and a reference to the opcode table is included in the single scheduler entry. Also, when the micro-operations use source operands, the reservation station is set to store all of the operands in an entry that is associated with the single scheduler entry.

For the example in FIG. 6, each micro-operation of the pair of micro-operations is considered "ready" for execution when the operands are present in the reservation station and ready to be provided to the execution unit that will execute the micro-operation and all necessary inputs and processor resources are available in other functional blocks and prepared for executing the first micro-operation. For example, when all of the operands have been produced by previous micro-operations and are available in the reservation station, etc.

The operations in FIG. 6 start when the picker logic determines that a first micro-operation of the pair of micro-operations stored in the single scheduler entry is ready for execution (step 600). For this operation, the picker logic checks the reservation station for the availability of the operands for executing the first micro-operation and may check other functional blocks to ensure that all necessary inputs and processor resources are available and prepared for executing the first micro-operation. As described above, however, the picker does not also check whether the second micro-operation is ready at this point (and the second micro-operation may or may not be ready).

The picker then picks information for the first micro-operation from the single scheduler entry and sends the first micro-operation to an execution unit to be executed (step 602). For this operation, the picker assembles the executable micro-operation by using the reference to the opcode table from the respective portion of the single scheduler entry to acquire the opcode for the first micro-operation, acquiring remaining information for the first micro-operation from appropriate portions of the single scheduler entry, and appending the remaining information to the opcode to form an executable micro-operation. The picker sends the first micro-operation to the execution unit for execution in a given cycle of a controlling clock (i.e., a cycle of clock signal that controls the operation of the picker and/or the execution unit).

The picker logic next determines that a second micro-operation of the pair of micro-operations stored in the single scheduler entry is ready for execution (step 604). For this operation, the picker logic checks the reservation station for the availability of the operands for executing the second micro-operation and may check other functional blocks to ensure that all necessary inputs and processor resources are available and prepared for executing the second micro-operation.

The picker then picks information for the second micro-operation from the single scheduler entry and sends the second micro-operation to the execution unit to be executed (step 606). For this operation, the picker assembles an executable micro-operation by using the reference to the opcode table from the respective portion of the single scheduler entry to acquire the opcode for the second micro-operation (or using an opcode that was earlier acquired along with the opcode for the first micro-operation), acquiring remaining information for the second micro-operation from appropriate portions of the single scheduler entry, and appending the remaining information to the opcode to form an executable micro-operation. In some embodiments, the picker sends the second micro-operation to the execution unit for execution in a cycle of a controlling clock that is subsequent to the given cycle of the controlling clock in which the picker sent the first micro-operation to the execution unit for execution (e.g., in a next cycle of the controlling clock or in a later cycle of the controlling clock).

Although an embodiment is described for FIG. 6 in which an opcode table is used for storing both opcodes for the compressed pair of micro-operations, the opcode is not used (and may not be present) in all embodiments. In embodiments in which all the information for one or both of the micro-operations (i.e., including the opcode) is present in the single scheduler entry, the picker can simply read the appropriate portions of the scheduler entry for each of the pair of compressed micro-operations and use the read information to form the executable micro-operations.

Figure 7:
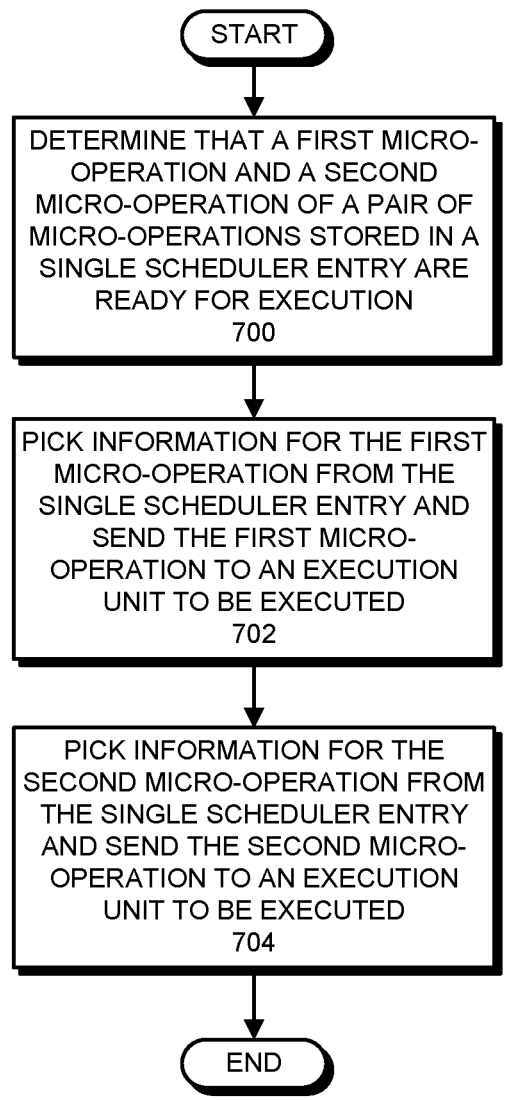
FIG. 7 presents a flowchart illustrating a process for picking a compressed pair of micro-operations from a single scheduler entry in accordance with some embodiments.

FIG. 7 presents a flowchart illustrating a process for picking a compressed pair of micro-operations from a single scheduler entry in accordance with some embodiments. Note that the operations shown in FIG. 7 are presented as a general example of operations performed by some embodiments. The operations performed by other embodiments include different operations, operations that are performed in a different order, and/or operations that are performed by different entities or functional blocks.

For the example in FIG. 7, the picker checks the readiness of both micro-operations of a pair of micro-operations that are compressed into a single scheduler entry before sending the micro-operations for execution. In other words, the picker checks the readiness of both a first micro-operation and a second micro-operation of a pair of micro-operations stored in a single scheduler entry for execution and then sends the first micro-operation and the second micro-operation for execution when both micro-operations are ready. This is in contrast to the embodiment shown in FIG. 6, in which the readiness of the micro-operations is checked separately. By ensuring that both micro-operations are ready, the picker can pick and send both micro-operations in sequence without performing a separate second check for the readiness of the second micro-operation—therefore conserving electrical power.

For the example in FIG. 7, it is assumed that operations were previously performed to compress a pair of micro-operations into a single scheduler entry. For example, in some embodiments, the operations shown in FIG. 5 were performed. The single scheduler entry therefore includes information for each of the pair of compressed micro-operations in respective portions. In addition, the opcodes for both of the pair of compressed micro-operations are stored in an opcode table (e.g., opcode table 226)—and a reference to the opcode table is included in the single scheduler entry. Also, when the micro-operations use source operands, the reservation station is set to store all of the operands in an entry that is associated with the single scheduler entry.

For the example in FIG. 7, each micro-operation of the pair of micro-operations is considered "ready" for execution when the operands are present in the reservation station and ready to be provided to the execution unit that will execute the micro-operation and all necessary inputs and processor resources are available in other functional blocks and prepared for executing the first micro-operation. For example, when all of the operands have been produced by previous micro-operations and are available in the reservation station, etc.

The operations in FIG. 7 start when the picker logic determines that a first micro-operation and a second micro-operation of a pair of micro-operations stored in the single scheduler entry are ready for execution (step 700). For this operation, the picker logic checks the reservation station for the availability of the operands for executing each of the micro-operations and may check other functional blocks to ensure that all necessary inputs and processor resources are available and prepared for executing each of the micro-operations. As described above, this operation involves ensuring that both micro-operations of the compressed pair of micro-operations are ready so that the micro-operations can be picked for execution without separately checking the second micro-operation.

The picker then picks information for the first micro-operation from the single scheduler entry and sends the first micro-operation to an execution unit to be executed (step 702). For this operation, the picker assembles the executable micro-operation by using the reference to the opcode table from the respective portion of the single scheduler entry to acquire the opcode for the first micro-operation, acquiring remaining information for the first micro-operation from appropriate portions of the single scheduler entry, and appending the remaining information to the opcode to form an executable micro-operation. The picker sends the first micro-operation to the execution unit for execution in a given cycle of a controlling clock (i.e., a cycle of clock signal that controls the operation of the picker and/or the execution unit).

The picker then picks information for the second micro-operation from the single scheduler entry and sends the second micro-operation to the execution unit to be executed (step 704). For this operation, the picker assembles the executable micro-operation by using the reference to the opcode table from the respective portion of the single scheduler entry to acquire the opcode for the second micro-operation (or using an opcode that was earlier acquired along with the opcode for the first micro-operation), acquiring remaining information for the second micro-operation from appropriate portions of the single scheduler entry, and appending the remaining information to the opcode to form an executable micro-operation. In some embodiments, the picker sends the second micro-operation to the execution unit for execution in a cycle of a controlling clock that is subsequent to the given cycle of the controlling clock in which the picker sent the first micro-operation to the execution unit for execution (e.g., in a next cycle of the controlling clock or in a later cycle of the controlling clock).

Although an embodiment is described for FIG. 7 in which an opcode table is used for storing both opcodes for the compressed pair of micro-operations, the opcode is not used (and may not be present) in all embodiments. In embodiments in which all the information for one or both of the micro-operations (i.e., including the opcode) is present in the single scheduler entry, the picker can simply read the appropriate portions of the scheduler entry for each of the pair of compressed micro-operations and use the read information to form the executable micro-operations.

Micro-Operation Queue Compression

In some embodiments, operations similar to the above-described operations for compressing pairs of micro-operations in scheduler entries are performed for micro-operations in a micro-operation queue (e.g., micro-operation queue 212). In these embodiments, a set of compressibility rules—which may be similar to the compressibility rules for compressing micro-operations in scheduler entries—is used by a fetch/decode unit (e.g., fetch/decode 208) and/or a controller for the micro-operation queue to determine pairs of micro-operations that are to be compressed into single micro-operation queue entries. Information for the pairs of micro-operations is then separately stored in portions of a single micro-operation queue entry. In some of these embodiments, in contrast to existing micro-operation queue entries, micro-operation queue entries include additional portions (e.g., opcode portions, metadata portions, etc.) that are used for storing information for or associated with both micro-operations. In some of these embodiments, the metadata associated with micro-operation queue entries is used for indicating pairs of micro-operations that are compressed in the micro-operation queue and/or for where information for each micro-operation is stored in the micro-operation queue entries. In some of these embodiments, the micro-operation queue compression may be carried forward to scheduler entries. In other words, pairs of micro-operations, once compressed in the micro-operation queue, remain compressed in scheduler entries.

In some embodiments, at least one electronic device (e.g., electronic device 100) uses code and/or data stored on a non-transitory computer-readable storage medium to perform some or all of the operations described herein. More specifically, the at least one electronic device reads code and/or data from the computer-readable storage medium and executes the code and/or uses the data when performing the described operations. A computer-readable storage medium can be any device, medium, or combination thereof that stores code and/or data for use by an electronic device. For example, the computer-readable storage medium can include, but is not limited to, volatile and/or non-volatile memory, including flash memory, random access memory (e.g., eDRAM, RAM, SRAM, DRAM, DDR4 SDRAM, etc.), non-volatile RAM (e.g., phase change memory, ferroelectric random access memory, spin-transfer torque random access memory, magnetoresistive random access memory, etc.), read-only memory (ROM), and/or magnetic or optical storage mediums (e.g., disk drives, magnetic tape, CDs, DVDs, etc.).

In some embodiments, one or more hardware modules perform the operations described herein. For example, the hardware modules can include, but are not limited to, one or more central processing units (CPUs)/CPU cores, graphics processing units (GPUs)/GPU cores, application-specific integrated circuit (ASIC) chips, field-programmable gate arrays (FPGAs), compressors or encoders, compute units, embedded processors, accelerated processing units (APUs), controllers, scheduler compression logic, and/or other functional blocks. When circuitry (e.g., integrated circuit elements, discrete circuit elements, etc.) in such hardware modules is activated, the circuitry performs some or all of the operations. In some embodiments, the hardware modules include general purpose circuitry such as execution pipelines, compute or processing units, etc. that, upon executing instructions (e.g., program code, firmware, etc.), performs the operations. In some embodiments, the hardware modules include purpose-specific or dedicated circuitry that performs the operations, possibly including circuitry that performs some or all of the operations "in hardware" and without executing instructions.

In some embodiments, a data structure representative of some or all of the functional blocks and circuit elements described herein (e.g., electronic device 100, processor 200, scheduler compression logic 224, schedulers 216-220, or some portion thereof) is stored on a non-transitory computer-readable storage medium that includes a database or other data structure which can be read by an electronic device and used, directly or indirectly, to fabricate hardware including the functional blocks and circuit elements. For example, the data structure may be a behavioral-level description or register-transfer level (RTL) description of the hardware functionality in a high-level design language (HDL) such as Verilog or VHDL. The description may be read by a synthesis tool which may synthesize the description to produce a netlist including a list of transistors/circuit elements from a synthesis library that represent the functionality of the hardware including the above-described functional blocks and circuit elements. The netlist may then be placed and routed to produce a data set describing geometric shapes to be applied to masks. The masks may then be used in various semiconductor fabrication steps to produce a semiconductor circuit or circuits (e.g., integrated circuits) corresponding to the above-described functional blocks and circuit elements. Alternatively, the database on the computer accessible storage medium may be the netlist (with or without the synthesis library) or the data set, as desired, or Graphic Data System (GDS) II data.

In this description, variables or unspecified values (i.e., general descriptions of values without particular instances of the values) are represented by letters such as N, M, and X. As used herein, despite possibly using similar letters in different locations in this description, the variables and unspecified values in each case are not necessarily the same, i.e., there may be different variable amounts and values intended for some or all of the general variables and unspecified values. In other words, particular instances of N and any other letters used to represent variables and unspecified values in this description are not necessarily related to one another.

The expression "et cetera" or "etc." as used herein is intended to present an and/or case, i.e., the equivalent of "at least one of" the elements in a list with which the etc. is associated. For example, in the statement "the electronic device performs a first operation, a second operation, etc.," the electronic device performs at least one of the first operation, the second operation, and other operations. In addition, the elements in a list associated with an etc. are merely examples from among a set of examples—and at least some of the examples may not appear in some embodiments.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

What is claimed is:

1. An electronic device including a processor, the processor comprising:
    a micro-operation queue;
    a plurality of scheduler entries, each of the scheduler entries including a set of fields for storing information for a single full micro-operation; and
    scheduler compression logic circuitry configured to, responsive to a pair of micro-operations in the micro-operation queue being compressible in accordance with one or more compressibility rules:
        acquire the pair of micro-operations from the micro-operation queue; and
        store information from both micro-operations of the pair of micro-operations into different portions in a single scheduler entry, by:
            storing information for a first micro-operation of the pair of micro-operations into less than all fields in the set of fields in the single scheduler entry; and
            storing information for a second micro-operation of the pair of micro-operations into available fields among the set of fields in the single scheduler entry by repurposing fields that are not storing information for the first micro-operation.

2. The electronic device of claim 1, wherein the processor further comprises:
    picker logic circuitry configured to:
        pick the information for the first micro-operation of the pair of micro-operations from the single scheduler entry and forward the first micro-operation for execution by the processor; and
        pick the information for the second micro-operation of the pair of micro-operations from the single scheduler entry and forward the second micro-operation for execution by the processor.

3. The electronic device of claim 2, wherein, when picking the information for the first and second micro-operations from the single scheduler entry, the picker logic circuitry is configured to:

determine that all source operands are available for both the first and second micro-operations in the single scheduler entry;

pick the information for both the first micro-operation and the second micro-operation from the single scheduler entry in consecutive cycles of a controlling clock; and forward the first micro-operation and the second micro-operation for execution by the processor in consecutive cycles of the controlling clock.

4. The electronic device of claim 2, wherein, when picking the information for the first and second micro-operations from the single scheduler entry, the picker logic circuitry is configured to:

determine that source operands are available for the first micro-operation in the single scheduler entry and pick the information for the first micro-operation from the single scheduler entry in a first cycle of a controlling clock; and determine that source operands are available for the second micro-operation in the single scheduler entry and pick the information for the second micro-operation from the single scheduler entry in a cycle of a controlling clock that is subsequent to the first cycle.

5. The electronic device of claim 1, further comprising: an opcode table including a number of opcode table entries;

wherein, along with storing the information from both micro-operations of the pair of micro-operations into the single scheduler entry, the scheduler compression logic circuitry is configured to:

store an opcode from at least one of the micro-operations of the pair of micro-operations into a given opcode table entry; and store a reference to the given opcode table entry in a portion in the single scheduler entry.

6. The electronic device of claim 1, wherein the compressibility rules include:

the micro-operations are adjacent to one another in the micro-operation queue;

specified information from both micro-operations in a candidate pair of micro-operations can be stored in different portions in a single scheduler entry at a same time; and only one read access and one write access of a flag register can be made by the micro-operations in the candidate pair of micro-operations.

7. The electronic device of claim 6, wherein the compressibility rules further include:

both of the micro-operations in the candidate pair of micro-operations are directed to a same scheduler from among two or more schedulers; or the micro-operations in the candidate pair of micro-operations can be stored together in a single scheduler entry in accordance with micro-operation execution rules.

8. The electronic device of claim 1, wherein the scheduler compression logic circuitry is further configured to:

responsive to the pair of micro-operations in the micro-operation queue not being compressible in accordance with the one or more compressibility rules, acquire the pair of micro-operations from the micro-operation queue and store information from each of the micro-operations of the pair of micro-operations into separate scheduler entries.

9. The electronic device of claim 1, further comprising: a reservation station;

wherein, along with storing the information from both micro-operations of the pair of micro-operations into different portions in the single scheduler entry, the scheduler compression logic circuitry is configured to cause the reservation station to store operands for both micro-operations of the pair of micro-operations in a single entry.

10. The electronic device of claim 1, wherein each scheduler entry includes portions for storing some or all of:

one or more destination register identifiers;
one or more source register identifiers; and
one or more immediate values.

11. The electronic device of claim 1, wherein:

each micro-operation of the pair of micro-operations is a reduced micro-operation having less information than a full micro-operation, so that information from both micro-operations of the pair of micro-operations can be stored into different fields of the single scheduler entry at a same time.

12. A method for handling micro-operations in an electronic device that includes a processor that comprises a micro-operation queue, a plurality of scheduler entries, each of the scheduler entries including a set of fields for storing information for a single full micro-operation, and scheduler compression logic circuitry, the method comprising:

responsive to a pair of micro-operations in the micro-operation queue being compressible in accordance with one or more compressibility rules:

acquiring, by the scheduler compression logic circuitry, the pair of micro-operations from the micro-operation queue; and storing, by the scheduler compression logic circuitry, information from both micro-operations of the pair of micro-operations into different portions in a single scheduler entry, by:

storing information for a first micro-operation of the pair of micro-operations into less than all fields in the set of fields in the single scheduler entry; and storing information for a second micro-operation of the pair of micro-operations into available fields among the set of fields in the single scheduler entry by repurposing fields that are not storing information for the first micro-operation.

13. The method of claim 12, wherein:

the processor further comprises picker logic circuitry; and
the method further comprises:

picking, by the picker logic circuitry, the information for the first micro-operation of the pair of micro-operations from the single scheduler entry and forward the first micro-operation for execution by the processor; and picking, by the picker logic circuitry, the information for the second micro-operation of the pair of micro-operations from the single scheduler entry and forward the second micro-operation for execution by the processor.

14. The method of claim 13, wherein picking the information for the first and second micro-operations from the single scheduler entry comprises:

determining, by the picker logic circuitry, that all source operands are available for both the first and second micro-operations in the single scheduler entry;

picking, by the picker logic circuitry, the information for both the first micro-operation and the second micro-operation from the single scheduler entry in consecutive cycles of a controlling clock; and forwarding, by the picker logic circuitry, the first micro-operation and the second micro-operation for execution by the processor in consecutive cycles of the controlling clock.

15. The method of claim 13, wherein picking the information for the first and second micro-operations from the single scheduler entry comprises:

determining, by the picker logic circuitry, that source operands are available for the first micro-operation in the single scheduler entry and picking, by the picker logic circuitry, the information for the first micro-operation from the single scheduler entry in a first cycle of a controlling clock; and determining, by the picker logic circuitry, that source operands are available for the second micro-operation in the single scheduler entry and picking, by the picker logic circuitry, the information for the second micro-operation from the single scheduler entry in a cycle of a controlling clock that is subsequent to the first cycle.

16. The method of claim 12, wherein:

the processor further comprises an opcode table including a number of opcode table entries; and the method further comprises:

along with storing the information from both micro-operations of the pair of micro-operations into the single scheduler entry, storing, by the scheduler compression logic circuitry, an opcode from at least one of the micro-operations of the pair of micro-operations into a given opcode table entry; and storing, by the scheduler compression logic circuitry, a reference to the given opcode table entry in a portion in the single scheduler entry.

17. The method of claim 12, wherein the compressibility rules include:

the micro-operations are adjacent to one another in the micro-operation queue;

specified information from both micro-operations in a candidate pair of micro-operations can be stored in different portions in a single scheduler entry at a same time; and only one read access and one write access of a flag register can be made by the micro-operations in the candidate pair of micro-operations.

18. The method of claim 17, wherein the compressibility rules further include:

both of the micro-operations in the candidate pair of micro-operations are directed to a same scheduler from among two or more schedulers; or the micro-operations in the candidate pair of micro-operations can be stored together in a single scheduler entry in accordance with micro-operation execution rules.

19. The method of claim 12, further comprising:

responsive to the pair of micro-operations in the micro-operation queue not being compressible in accordance with the one or more compressibility rules, acquiring, by the scheduler compression logic circuitry, the pair of micro-operations from the micro-operation queue and storing, by the scheduler compression logic circuitry, information from each of the micro-operations of the pair of micro-operations into separate scheduler entries.

20. The method of claim 12, wherein:

the processor further comprises a reservation station; and the method further comprises:

along with storing the information from both micro-operations of the pair of micro-operations into different portions in the single scheduler entry, causing, by the scheduler compression logic circuitry, the reservation station to store operands for both micro-operations of the pair of micro-operations in a single entry.

21. The method of claim 12, wherein each scheduler entry includes portions for storing some or all of:

one or more destination register identifiers;

one or more source register identifiers; and one or more immediate values.

22. The method of claim 12, wherein:

each micro-operation of the pair of micro-operations is a reduced micro-operation having less information than a full micro-operation, so that information from both micro-operations of the pair of micro-operations can be stored into different fields of the single scheduler entry at a same time.

\* \* \* \* \*